United States Patent
Marchese

(10) Patent No.: US 11,037,261 B2
(45) Date of Patent: Jun. 15, 2021

(54) METHOD AND SYSTEM FOR EXCHANGING SHIPPING CONTAINERS

(71) Applicant: MATCHBOX EXCHANGE PTY LTD, Melbourne (AU)

(72) Inventor: Carl Marchese, Toorak (AU)

(73) Assignee: MATCHBOX EXCHANGE PTY LTD, Melbourne (AU)

( * ) Notice: Subject to any disclaimer, the term of this patent is extended or adjusted under 35 U.S.C. 154(b) by 126 days.

(21) Appl. No.: 16/484,437

(22) PCT Filed: Jan. 30, 2018

(86) PCT No.: PCT/IB2018/050542
§ 371 (c)(1),
(2) Date: Aug. 7, 2019

(87) PCT Pub. No.: WO2018/146576
PCT Pub. Date: Aug. 16, 2018

(65) Prior Publication Data
US 2020/0005418 A1     Jan. 2, 2020

(30) Foreign Application Priority Data

Feb. 7, 2017 (AU) ................................ 2017900371

(51) Int. Cl.
G06Q 50/28     (2012.01)
G06Q 30/06     (2012.01)
(Continued)

(52) U.S. Cl.
CPC ......... G06Q 50/28 (2013.01); G06Q 30/0611 (2013.01); G06Q 10/04 (2013.01); G06Q 99/00 (2013.01)

(58) Field of Classification Search
None
See application file for complete search history.

(56) References Cited

U.S. PATENT DOCUMENTS 8,849,724 B2 * 9/2014 May .................... G06Q 10/083
705/333
9,378,482 B1 * 6/2016 Pikler ................. G06Q 10/087
(Continued)

FOREIGN PATENT DOCUMENTS

| KR | 10-2005-0070656 A | 7/2005 |
| KR | 10-2010-0018209 A | 2/2010 |
| WO | 2015-030551 A1 | 3/2015 |

OTHER PUBLICATIONS

Islam, S., et al., "Reengineering the seaport container truck hauling process: Reducing empty slot trips for transport capacity improvement," Business Process Management Journal, 19.5, pp. 752-782, Emerald Group Publishing Limited. (Year: 2013).*

(Continued)

*Primary Examiner* — Nicholas D Rosen
(74) *Attorney, Agent, or Firm* — Haynes and Boone, LLP

(57) ABSTRACT

A computer-implemented method under control of one or more computing devices configured with specific computer-executable instructions, the method comprising: receiving a request from a first user of a group of users for an empty export container; notifying the group of users of the request; receiving an offer from a second user of the group of users to match the request by exchanging an empty import container owned or leased by a shipping line; notifying the first user of the offer; if the offer is accepted by the first user, determining if the empty import container is approved by the shipping line top be exchanged as the empty export container; if the empty import container is approved, notifying the first and second users to exchange the empty import container as the empty export container.

14 Claims, 21 Drawing Sheets

(51) Int. Cl.
  *G06Q 10/04* (2012.01)
  *G06Q 99/00* (2006.01)

(56) References Cited

U.S. PATENT DOCUMENTS

| | | | | |
|---|---|---|---|---|
| 2006/0111929 A1* | 5/2006 | Poole | G06Q 10/087 | 705/1.1 |
| 2013/0173487 A1* | 7/2013 | May | G06Q 10/083 | 705/333 |
| 2014/0101059 A1 | 4/2014 | Hsiao | | |
| 2015/0012458 A1* | 1/2015 | May | G06Q 10/00 | 705/333 |
| 2016/0110807 A1* | 4/2016 | Downes | G06Q 40/04 | 705/37 |
| 2017/0148125 A1* | 5/2017 | Ericksrud | G06Q 50/28 | |
| 2019/0287066 A1* | 9/2019 | Kellaway, Jr. | G06Q 10/1097 | |

OTHER PUBLICATIONS

International Search Report and Written Opinion dated Jun. 15, 2018 in International Application No. PCT/IB2018/050542 (9 pages).
International Preliminary Report on Patentability dated May 28, 2019 in International Application No. PCT/IB2018/050542 (9 pages).

* cited by examiner

Figure 5

EXCHANGE Request ← 122

Dear MATCH Port Logistics,

The below request has been posted on MATCH BOX. Please confirm if you are able to supply matching containers before cut-off by clicking the link below.

For: SEQH
Shipping Line: OOCL (SLA)
Size: 40
Type: HC
Onto Release number: 4041014980
Drop-Off: SEQH OCC PAULO Hemmant, QLD 4174
Cut OFF: 23/01/2017 22:00

BEFORE OFFERING ANY CONTAINERS FOR EXCHANGE PLEASE ENSURE THAT YOU INSPECT CONTAINERS TO CONFIRM THEY ARE CLEAN, FREE OF DAMAGE AND FIT FOR USE AS PER OUR STANDARD TERMS & CONDITIONS.

OFFER CONTAINERS FOR EXCHANGE

Regards

MATCH BOX Exchange

Exchange Offer Request

Dear MATCH Port Logistics,

Box is offered for exchange.

JobType: Drop-off
Address: DEPOT Lytton, QLD 4178
Cut Off: 10/02/2017 15:00
Container Number: CMAU8887777
Offered by: SEQH
Size: 40
Type: HC
Onto Release number: 6142424244

Please use the link to review and approve/reject offers

Regards

MATCH BOX Exchange

RE-USE Request

Dear OOCL (SLA),

We seek your approval to RE-USE this container as set out below.

Container Number: OOLU8385014
Size: 40
Type: HC
Onto Release number: 4041208180

PLEASE CLICK ON THE LINK BELOW TO APPROVE OR DISAPPROVE THIS REQUEST.

<u>APPROVED NOT-APPROVED</u> ← 152

Regards

MATCH BOX Exchange

Home > Dashboard

Found total 66 records

| Line | Export Customer | Box Size | Box Type | Release Number | Status | Service type | Location | Delivery Date | Import Id | Booking Id | File Name |
|---|---|---|---|---|---|---|---|---|---|---|---|
| COSCO Shipping Lines (SLA) | Deacon Seeds | 20 | GP | 6146609600 | Booked | Trailer | 123 Knight ST, Darby, QLD 4465 | 29/01/2018 | | | secfx-ti-export-26011814452 |
| COSCO Shipping Lines (SLA) | GENUINE RECYCLING | 40 | HC | 6146619320 | Booked | Side Loader | 120 COSMOSH STREET, Heemmont, QLD 4174 | 29/01/2018 | | | secfx-ti-export-26011814452 |
| MAERSK Australia (Brisbane Approvals) | Viscount plastics | 40 | HC | 9638752276 | Booked | Side Loader | 158 CORBAY STREET, Carole Park, QLD 4300 | 29/01/2018 | | | secfx-ti-export-26011814392 |
| MAERSK Australia (Brisbane Approvals) | USG BORAL | 40 | HC | 9638743645 | Booked | Side Loader | 22 KIRRA ST, Pinkenba, QLD 4008 | 29/01/2018 | | | secfx-ti-export-26011814402 |
| MAERSK Australia (Brisbane Approvals) | USG BORAL | 40 | HC | 9638743645 | Booked | Side Loader | 22 KIRRA ST, Pinkenba, QLD 4008 | 29/01/2018 | | | secfx-ti-export-26011814402 |
| MAERSK Australia (Brisbane Approvals) | USG BORAL | 40 | HC | 9638743645 | Booked | Side Loader | 22 KIRRA ST, Pinkenba, QLD 4008 | 29/01/2018 | | | secfx-ti-export-26011814402 |

METHOD AND SYSTEM FOR EXCHANGING SHIPPING CONTAINERS

CROSS REFERENCE TO RELATED APPLICATIONS

This application is a national phase filing under 35 U.S.C. § 371 of International Application No. PCT/IB2018/050542, filed Jan. 30, 2018; which claims the benefit of priority from Australian Patent Application No. 2017900371, filed Feb. 7, 2017, the entire contents of which are hereby incorporated by reference.

FIELD

The present invention relates to a method and system for exchanging shipping containers.

BACKGROUND

The global growth of containerised freight creates problems for regional transportation systems surrounding ports. Existing systems for container transport to and from the ports relies primarily on truck trips between the ports and off-site (or 'landside') transport locations.

For import cargo, loaded shipping containers are picked up by transport companies from a port terminal and are delivered to the consignee for unloading. These empty containers are then returned to a container park, usually by the same transport company.

The same container handling practice is in place for export cargo. Transport companies (or carriers) pick up empty containers required by an exporter from the container park and deliver these empty containers to the exporter for loading. After a container has been loaded, a transport company will transport the loaded container to the port terminal where it will be stacked at the pier prior to loading on to a container ship.

It is clear that, in the case of both export and import cargo, half of the required truck trips involve empty container movements, either for empty pickup or empty return. This critical logistics inefficiency may be referred to as the 'landside empty container problem.'

Existing solutions to the landside empty container problem consist of 'container triangulation' (also referred to as 'container reuse'). Essentially, triangulation involves converting containers from import containers to export containers. The most common triangulation example is the reuse and reloading of an import container at the same location for an export booking once it has been unloaded.

Conventional triangulation suffers from the drawback that it is a 'closed' solution in the sense that only the same empty containers can be reused by the same transport companies. That is, it does not allow different empty containers to be openly exchanged or swapped between different transport companies based on their different container requirements.

In this context, there is a need for solutions to improve empty container logistics practices.

SUMMARY

According to the present invention, there is provided a computer-implemented method under control of one or more computing devices configured with specific computer-executable instructions, the method comprising:
receiving a request from a first user of a group of users for an empty export container;
notifying the group of users of the request;
receiving an offer from a second user of the group of users to match the request by exchanging an empty import container owned or leased by a shipping line;
notifying the first user of the offer;
if the offer is accepted by the first user, determining if the empty import container is approved by the shipping line to be exchanged as the empty export container;
if the empty import container is approved, notifying the first and second users to exchange the empty import container as the empty export container.

The group of users may comprise a plurality of different transport companies.

The request may comprise information relating to requestor, shipping line, container size, container type, container grade, commodity, export release number, pick-up/drop-off location, cut-off date/time, and combinations thereof.

The offer may comprise information relating to exchange type (drop-off or pick-up), drop-off or pick-up location, cut-off date/time, container number, offeror, container size, container type, container (or "box") grade, commodity (or container contents), export release number, and combinations thereof.

The method may further comprise receiving confirmation from the first and second users that exchange of the empty import container as the empty export container has been completed.

The step of determining if the empty import container is approved to be exchanged as the empty export container may comprise comparing the empty import container with a database of containers pre-approved for exchange by the shipping line.

Alternatively, the step of determining if the empty import container is approved to be exchanged as the empty export container may comprise requesting and receiving approval from the shipping line for the empty import container to be exchanged as the empty export container.

The database of containers pre-approved for exchange by the shipping line may be generated by electronic data interchange (EDI) with the shipping line.

The method may further comprise generating a dashboard user interface that enables an individual user of the group of users to view, filter and manage a plurality of information relating to a plurality of empty import containers available for exchange as empty export containers among the group of users.

The method may further comprise recommending matches between empty import containers and empty export containers available to be exchanged between individual users of the group of users, wherein the recommended matches are based at least in part on:
type of container;
location of container;
required delivery date;
distance between exchange locations;
access time at location of container;
type of transport vehicle; and
estimated time of arrival of transport vehicle at location of container.

The method may further comprise notifying individual users of the group of users of the recommended matches.

The method may further comprise predicting matches between empty import containers and empty export containers to be exchanged between individual users of the group of users, wherein the predicted matches are based at least in part on historical data relating to surpluses and shortfalls of empty import containers and empty export containers by the individual users of the group of users.

The present invention further provides a system, comprising:
one or more non-transitory computer readable storage media;
one or more processors; and
one or more program modules stored in the one or more non-transitory computer readable storage media and executed by the one or more processors to:
receive a request from a first user of a group of users for an empty export container;
notify the group of users of the request;
receive an offer from a second user of the group of users to match the request by exchanging an empty import container owned or leased by a shipping line;
notify the first user of the offer;
if the offer is accepted by the first user, determine if the empty import container is approved by the shipping line to be exchanged as the empty export container;
if the empty import container is approved, notify the first and second users to exchange the empty import container as the empty export container.

The present invention also provides a non-transitory computer-readable medium storing specific computer-executable instructions that, when operated by a processor, perform operations comprising:
receiving a request from a first user of a group of users for an empty export container;
notifying the group of users of the request;
receiving an offer from a second user of the group of users to match the request by exchanging an empty import container owned or leased by a shipping line;
notifying the first user of the offer;
if the offer is accepted by the first user, determining if the empty import container is approved by the shipping line to be exchanged as the empty export container;
if the empty import container is approved, notifying the first and second users to exchange the empty import container as the empty export container.

BRIEF DESCRIPTION OF DRAWINGS

Embodiments of the invention will now be described by way of example only with reference to the accompanying drawings, in which:
FIGS. 5, 7 and 9 to 14 are example user interfaces generated by the method;
FIGS. 6 and 8 are example email notifications generated by the method;
FIGS. 18 to 21 are example user interfaces relating to container exchange recommendations (or suggestions) generated by the method.

DESCRIPTION OF EMBODIMENTS

Figure 1:
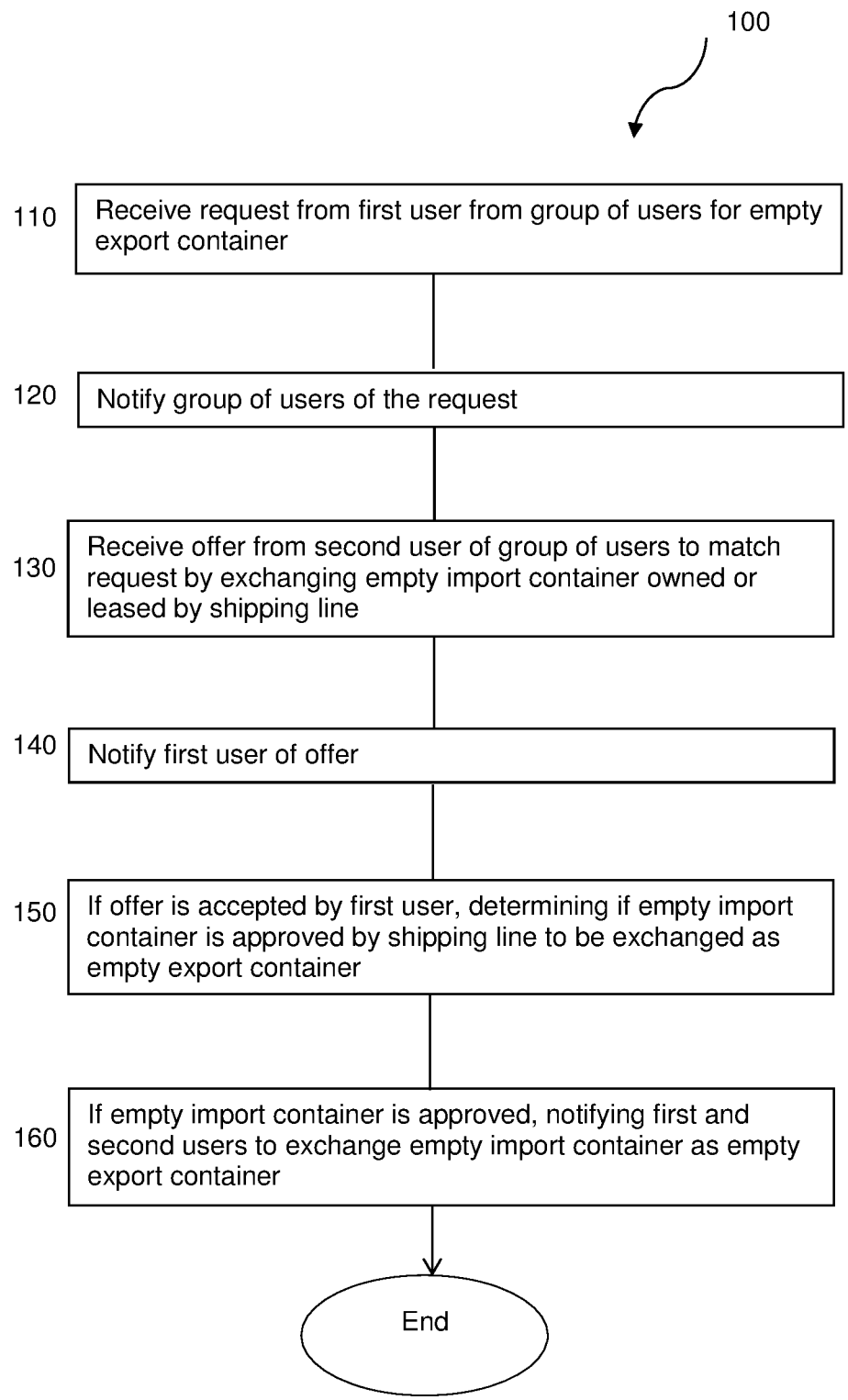
FIG. 1 is a flowcharts of a computer-implemented method for exchanging empty shipping containers according to embodiments of the present invention.
Figure 2:
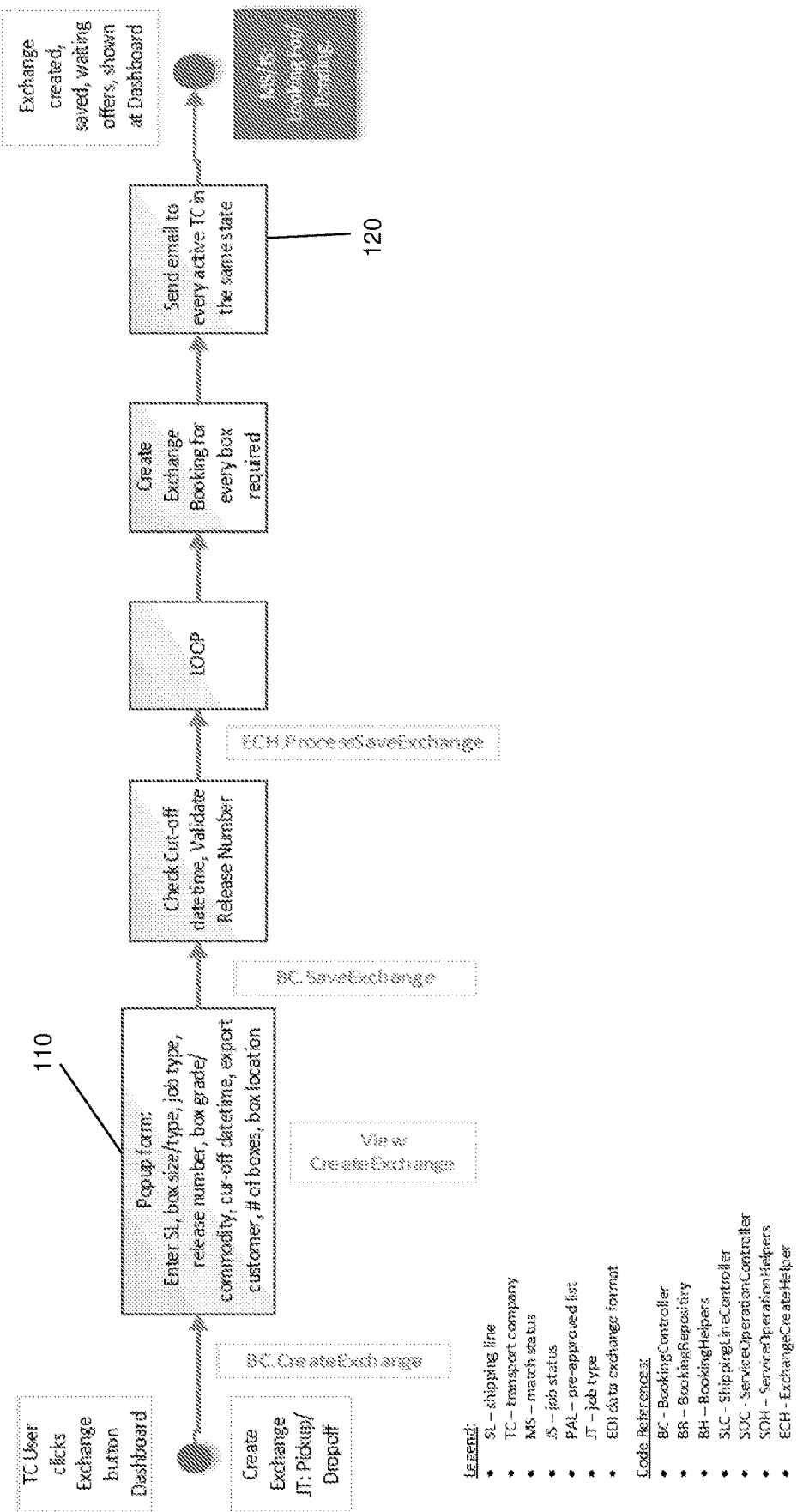
FIGS. 2 to 4 are workflow diagrams of processes performed during the method of FIG. 1.
Figure 3:
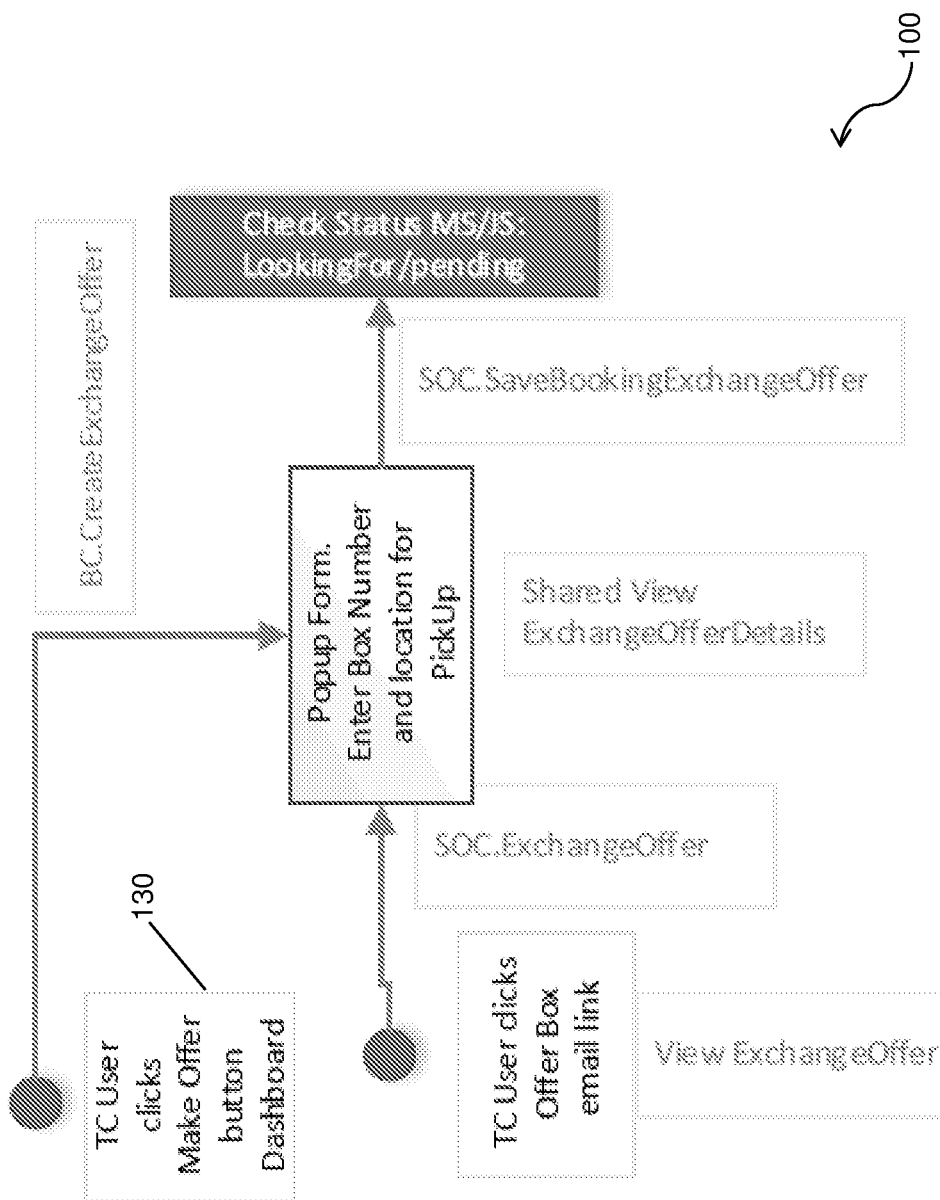
Figure 4:
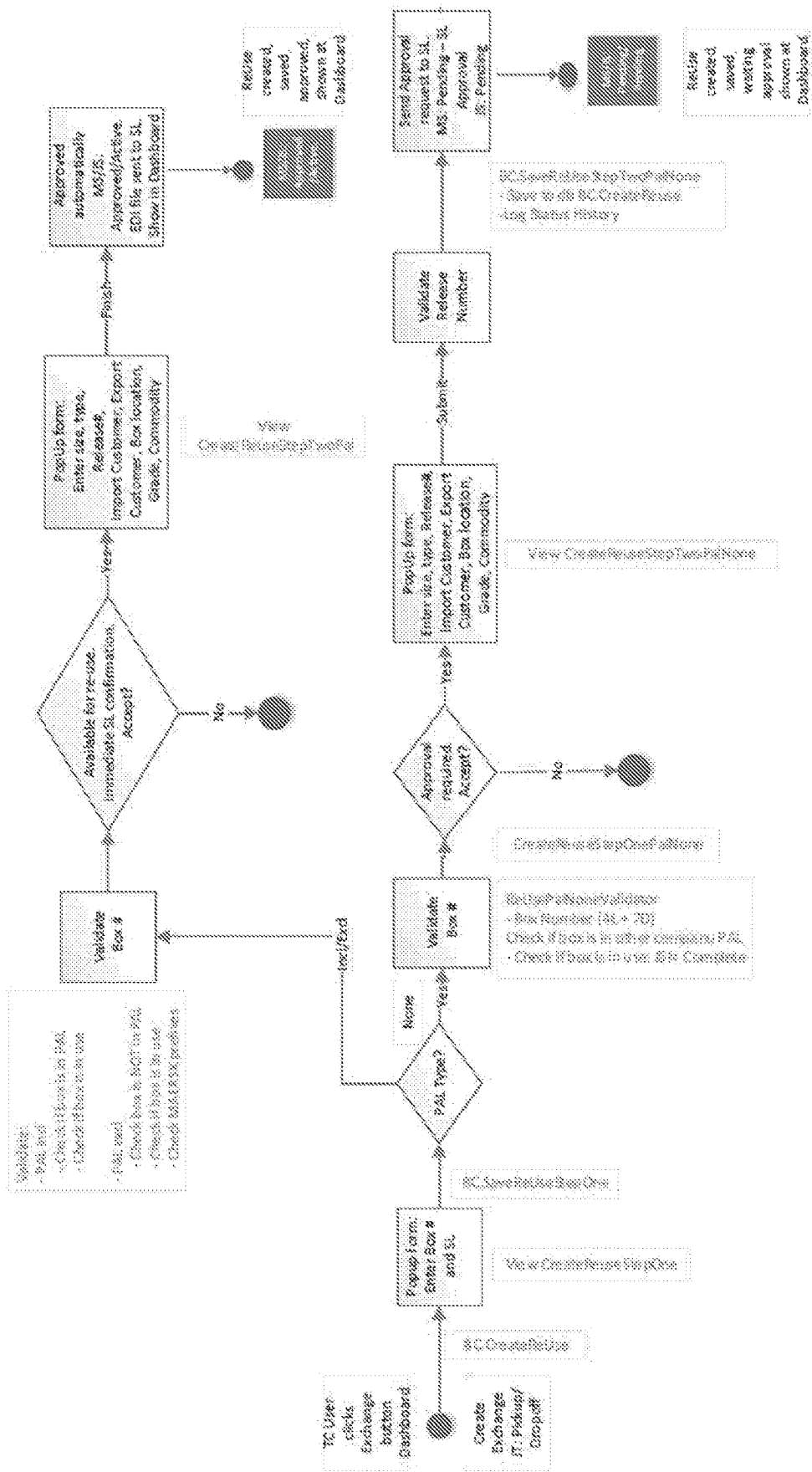
Figure 5:
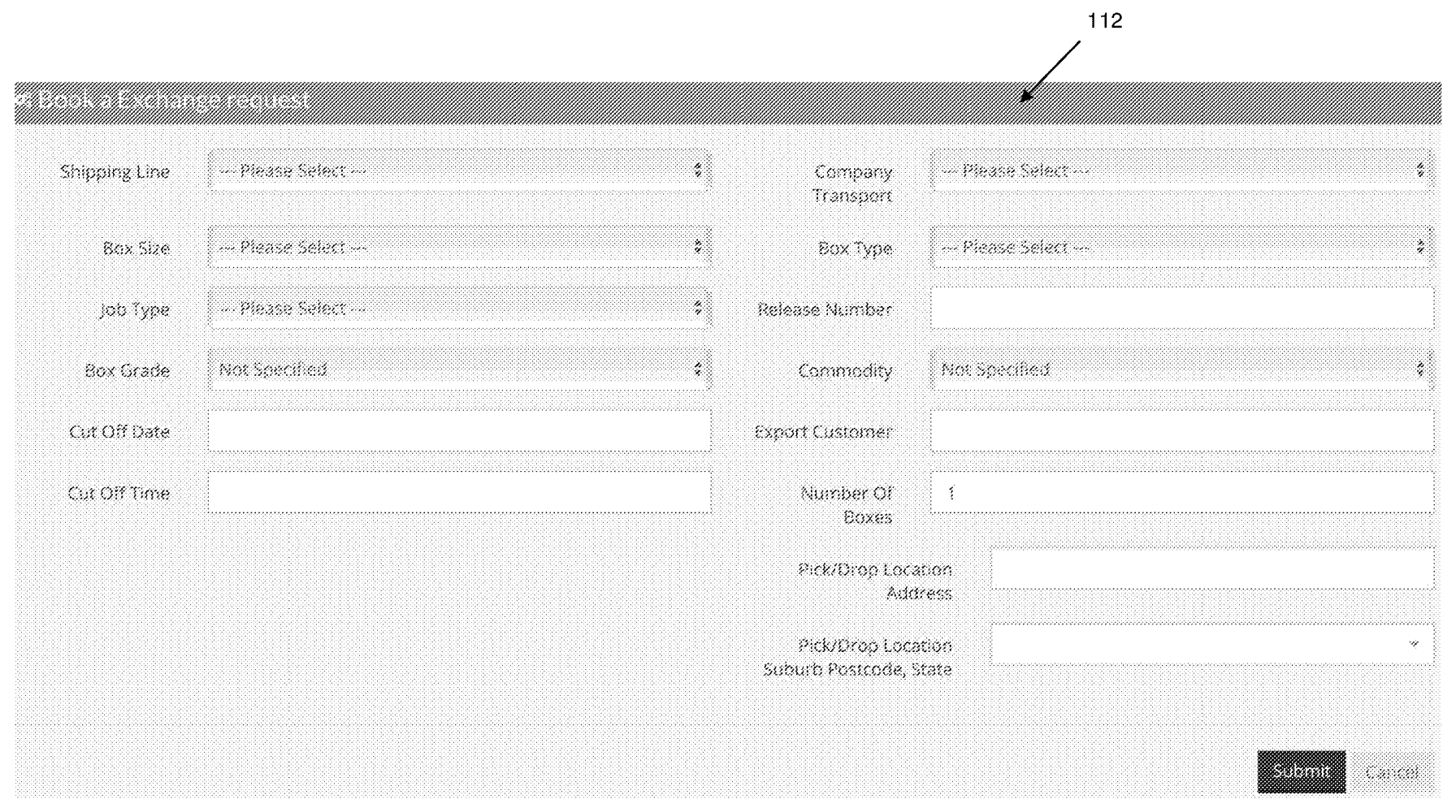

Referring to FIGS. 1 to 4, a computer-implemented method 100 for exchanging empty shipping containers according to an embodiment of the present invention starts by receiving a request from a first user of a group of users for an empty export container (110). The group of users may comprise a plurality of different transport companies. FIG. 5 is an example user interface 112 generated by the method 100 to enable the first user to book the request. The request may comprise information relating to requestor, shipping line, container size, container type, export release number, pick-up/drop-off location, cut-off date/time, and combinations thereof.

Next, the group of users may be notified of the first user's request (120). FIG. 6 is an example email 122 sent to the group of users notifying them of the first user's request. Preferably the computer-implemented method 100 comprises automatically sending the email 122 to the group of users (or a subset of the group) after the request (120) is received. Alternative or equivalent automated notifications may be used, for example, push notifications to mobile devices, Short Message Service (SMS) messages, in-app notifications, etc.

Figure 7:
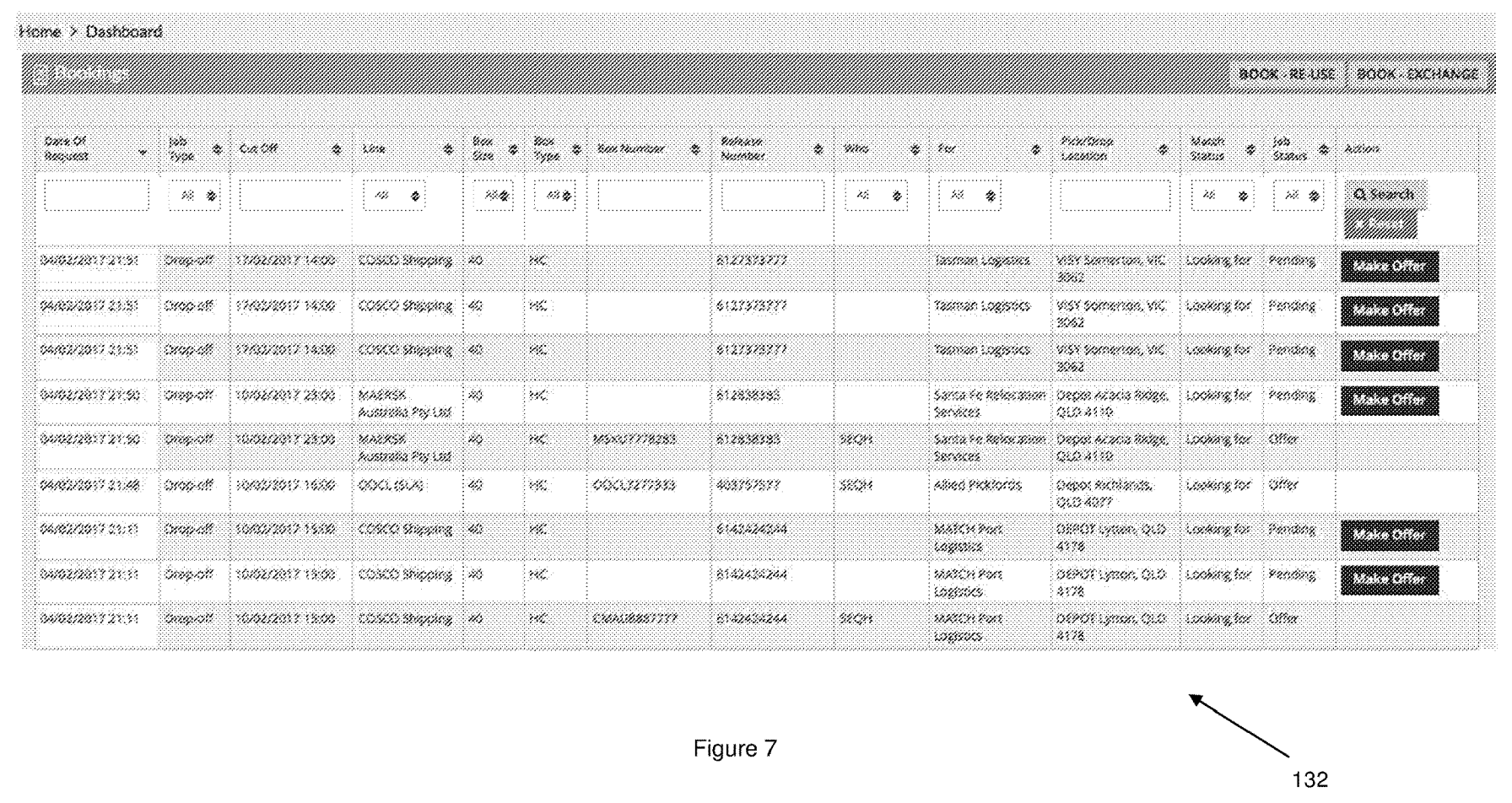

The method 100 may move to receiving an offer from a second user of the group of users to match the request by exchanging an empty import container owned or leased by a shipping line (130). FIG. 7 is an example user interface 132 generated by the method 100 to enable the second user to make the offer. The offer may comprise information relating to exchange type (drop-off or pick-up), drop-off or pick-up location, cut-off date/time, container serial number, offeror, container size, container type, export release number, and combinations thereof.

Next, the first user may be notified of the offer from the second user (140). FIG. 8 is an example email 142 sent to the first user notifying them of the second user's offer. As discussed above, the method 100 may comprise automatically sending the email 142 and/or alternative notifications to the first user.

Figure 9:
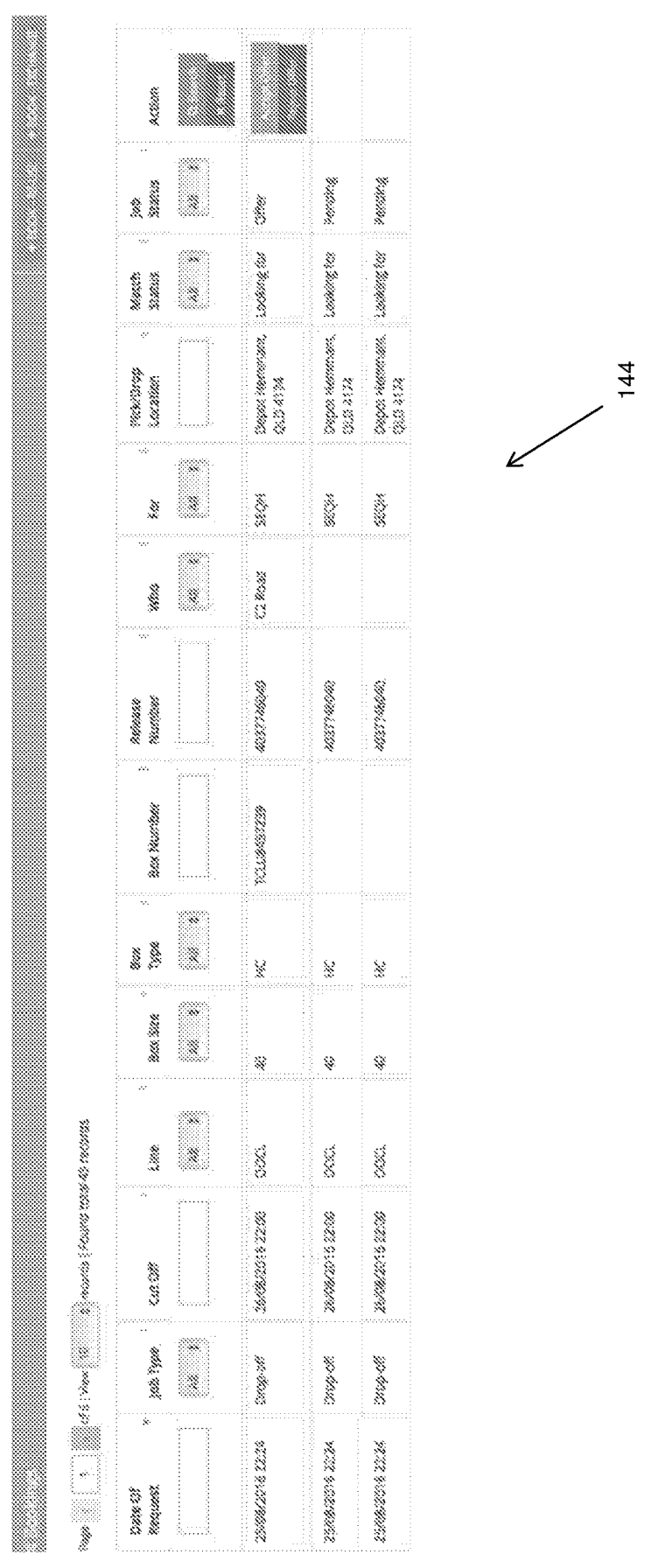

FIG. 9 is an example user interface 144 generated by the method 100 to enable the first user to accept or reject the second user's offer. If the offer is accepted, the method 100 may move to determining if the empty import container is approved by the shipping line to be exchanged as the empty export container (150).

The step of determining if the empty import container is approved to be exchanged as the empty export container may comprise comparing the empty import container with a database of containers pre-approved for exchange by the shipping line. The database of containers pre-approved for exchange by the shipping line may be generated by a direct electronic data interchange EDI with the shipping line. Alternatively, pre-approved lists (PALs) of containers pre-approved for exchange by the shipping line may be uploaded in comma-separated values (CSV) files. The PALs are not directly accessible by transport company users, however the approval status of individual containers is shown once a booking has been made. In some embodiments, the step of determining if the empty import container is approved to be exchanged may be performed prior to notifying the first user of the offer from the second user (140).

Alternatively, if the empty import container is not pre-approved, the step of determining if the empty import container is approved to be exchanged as the empty export container may comprise requesting and receiving approval from the shipping line for the empty import container to be exchanged as the empty export container. FIG. 10 is an example email sent to the shipping line to seek approval. The email contains "Approval" and "Not Approved" links which when activated perform a number of automated tasks including: (a) sending an email to the transport company user notifying them of the shipping line's approval; (b) sending an email receipt or acknowledgement of their approval or disapproval; and (c) updating the user's dashboard.

Figure 12:
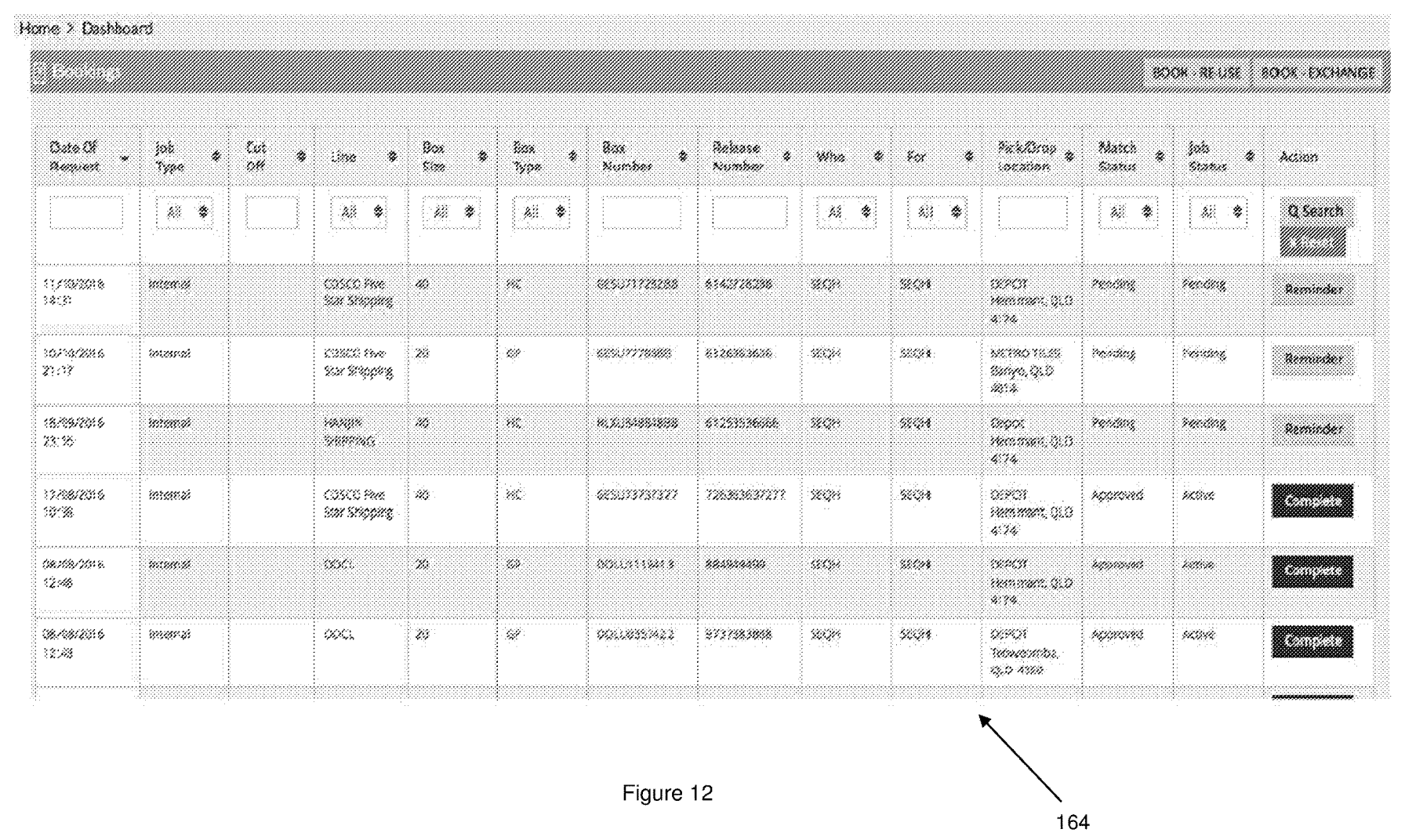

If and when the empty import container is approved, the method 100 may end by notifying the first and second users to exchange the empty import container as the empty export container (160). FIG. 12 is an example user interface 164 generated by the method 100 that notifies the first and second users that the empty import container is approved to be exchanged as the empty export container.

Figure 11:
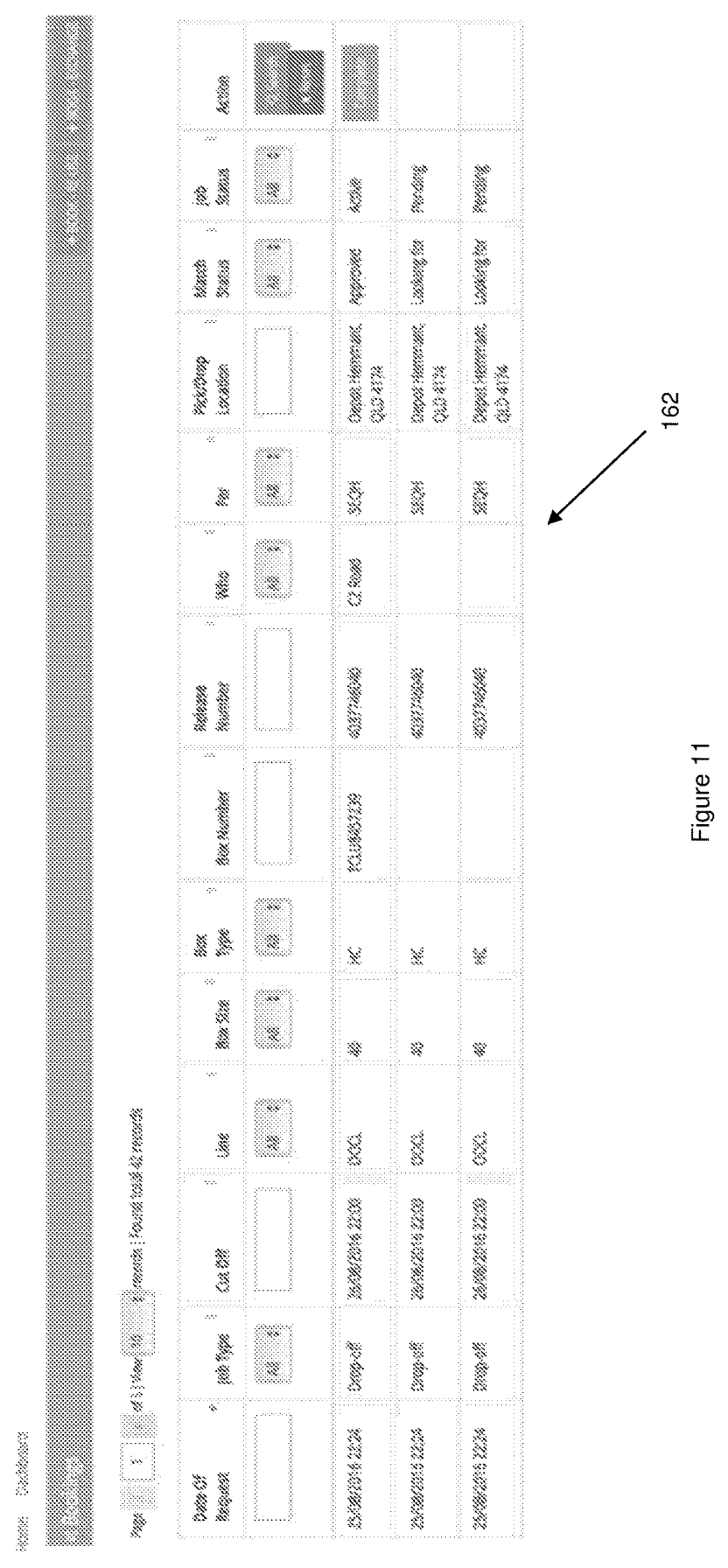

The method 100 may further comprise receiving confirmation from the first and second users that exchange of the empty import container as the empty export container has been completed. FIG. 11 is an example user interface 162 generated by the method 100 to confirm that exchange has been completed.

Figure 13:
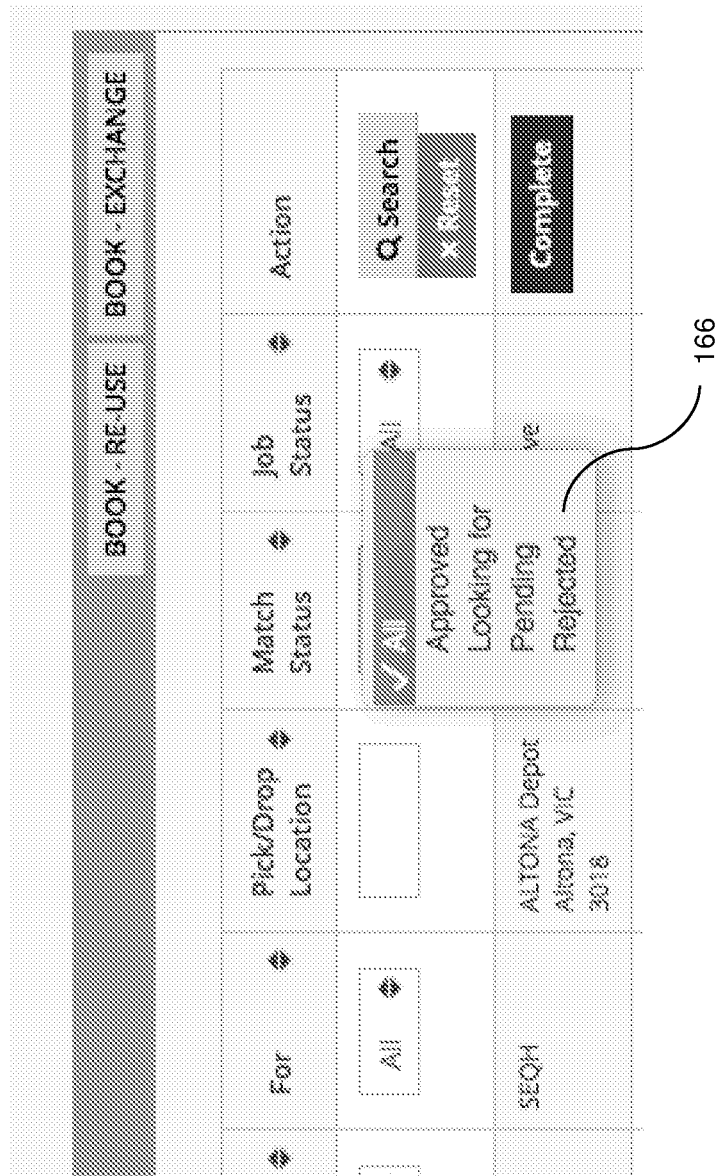
Figure 14:
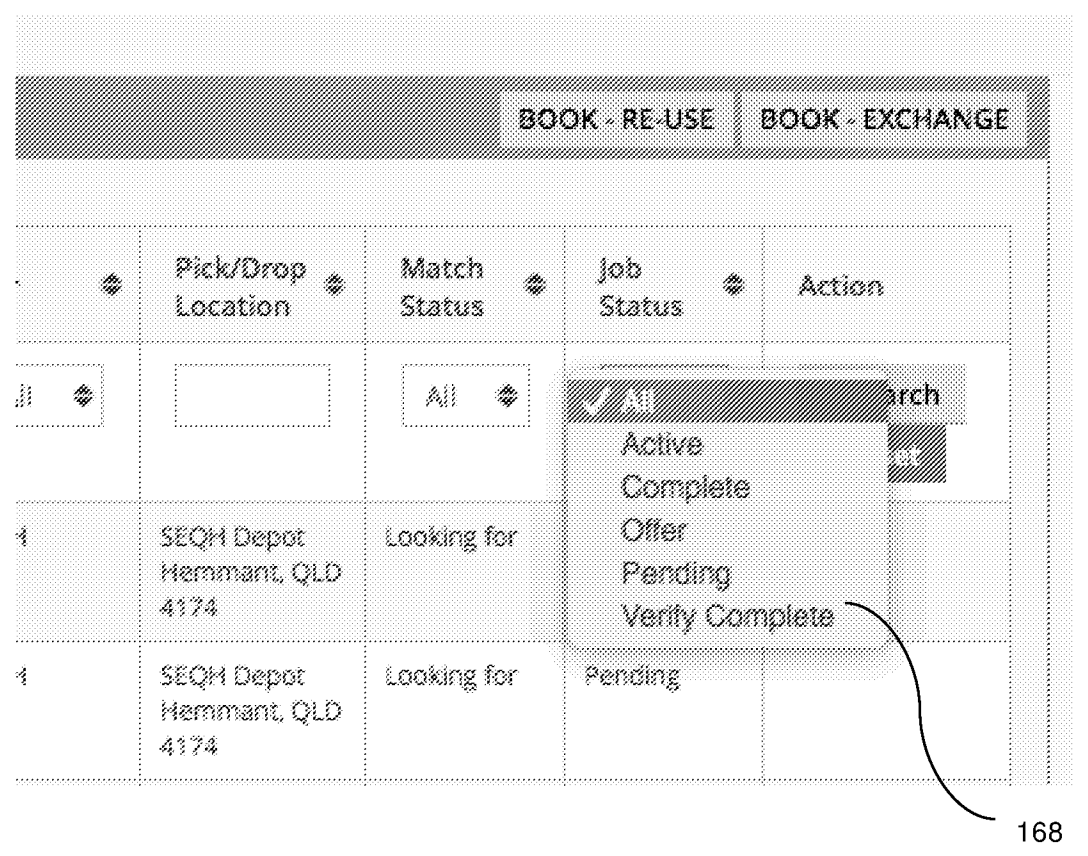

Referring to FIG. 12, the method 100 may further comprise generating a dashboard user interface 164 that enables an individual user of the group of users to view, filter (eg, 'search,' 'look for,' etc) and manage a plurality of information relating to a plurality of empty import containers available for exchange as empty export containers among the group of users. FIGS. 13 and 14 are example drop down menus 166, 168 that enable individual users to manage the 'match status' of requests and offers, and the 'action status' of approved exchanges. The plurality of information presented in the dashboard 164 of FIG. 12 may, for example, comprise the information in the Table 1 below.

TABLE 1

How to read the Matchbox Dashboard

| Item | What does it mean? |
|---|---|
| Date of Reques | This is the date & time of your booking |
| Job Type | This can be either "Internal" for Re---Use bookings or "Drop Off or Pick Up" for Exchange booking |
| Cut-Off | This is the cut off time stipulated by the transport company looking for containers |
| Line | This is the shipping line relevant to the booking (eg MAERSK) |
| Box Size | This is the size of the containers (20 or 40') |
| Box Type | This is the type of container (GP - General Purpose or HC - High Cube) |
| Box Number | This is the container number relevant to the booking |
| Release | This is the export booking number (Release #) |
| Box Grade | This is the grade of shipping container required (eg, food quality, general or scrap) |
| Commodity | This is the type of commodity you plan to pack inside the container (eg, building materials, cotton, paper products or scrap plastics) |
| Who | This is the name of the transport company who has offered a container for exchange. Please note that in the case of an exchange with another transport company the "who" and "for" will show the two parties to the exchange |
| For | This is the name of the transport company who is looking for an empty container to exchange |
| Pick/Drop location | This is the drop off or pick up location stipulated by the transport company who placed the booking (the party looking for a container to exchange)<br>Please note that in the case of "Pick Up" bookings it is possible to stipulate a region from which you are willing to pick up a suitable empty container (e.g. Gold Coast region). When the alternate transport company has a matching container and they "offer" to exchange it with you, at the point of offer they will confirm the actual address of the pick---up location. This is then reflected on your dashboard and the email you will receive alerting you of the offer. |
| MATCH Status | This represents the overall status of your booking.<br>There are a number of MATCH Statuses. See explanations below:<br>Pending - This indicates that booking is waiting on approval<br>Looking For - This indicates to users that the "For" party is looking for suitable matching empty containers<br>Approved - This indicates that the booking has been approved and the Re-Use or Exchange can proceed as per MATCHBOX Exchange terms and conditions. |
| Job Status | Job status represents the stage of the booking.<br>Pending - This indicates that booking is waiting for approval from shipping line or from the transport company considering an offer to exchange a container<br>Active - This indicates that the booking is approved, parties are now committed to complete the re---use/exchange but it has not yet been completed (as per MATCHBOX terms and conditions this must occur within 24 hrs of approval or before the nominated cut off - whichever occurs first)<br>Offer - This indicates that an offer has been received from an alternate transport company who has offered matching containers to exchange.<br>Completed - This indicates that the booking has been completed (completed is when container has been re---used or exchanged with another transport company and marked as complete) |
| Action | This is where users can offer, accept and complete bookings. Below is an explanation of what each Action button does. |

TABLE 1-continued

How to read the Matchbox Dashboard

| Item | What does it mean? |
| --- | --- |
| Reminder | This will send a reminder to the shipping line when approval is still outstanding. This should only be used after 2 hrs has lapsed from the time the booking was made. |
| Make Offer | This is where you can offer containers to other transport companies looking for containers |
| Accept Offer/Reject | This button will appear when you are the company looking for containers and others have offered containers for exchange with you |
| Complete | This is where you complete your booking after you have re--used/exchanged the container |
| Verify Complete | This is where the other transport company to an exchange has marked booking their end as "complete" and system is now asking you to verify that exchange has successfully taken place. |
| Search | You are able to search and filter the data on your dashboard by using the filters to the top of each column. Once you have made your selections simply hit "Search" and the dashboard will only show containers that meet the criteria of your search parameters |
| Reset | The reset button clears all search filters and displays all bookings. |

Figure 15:
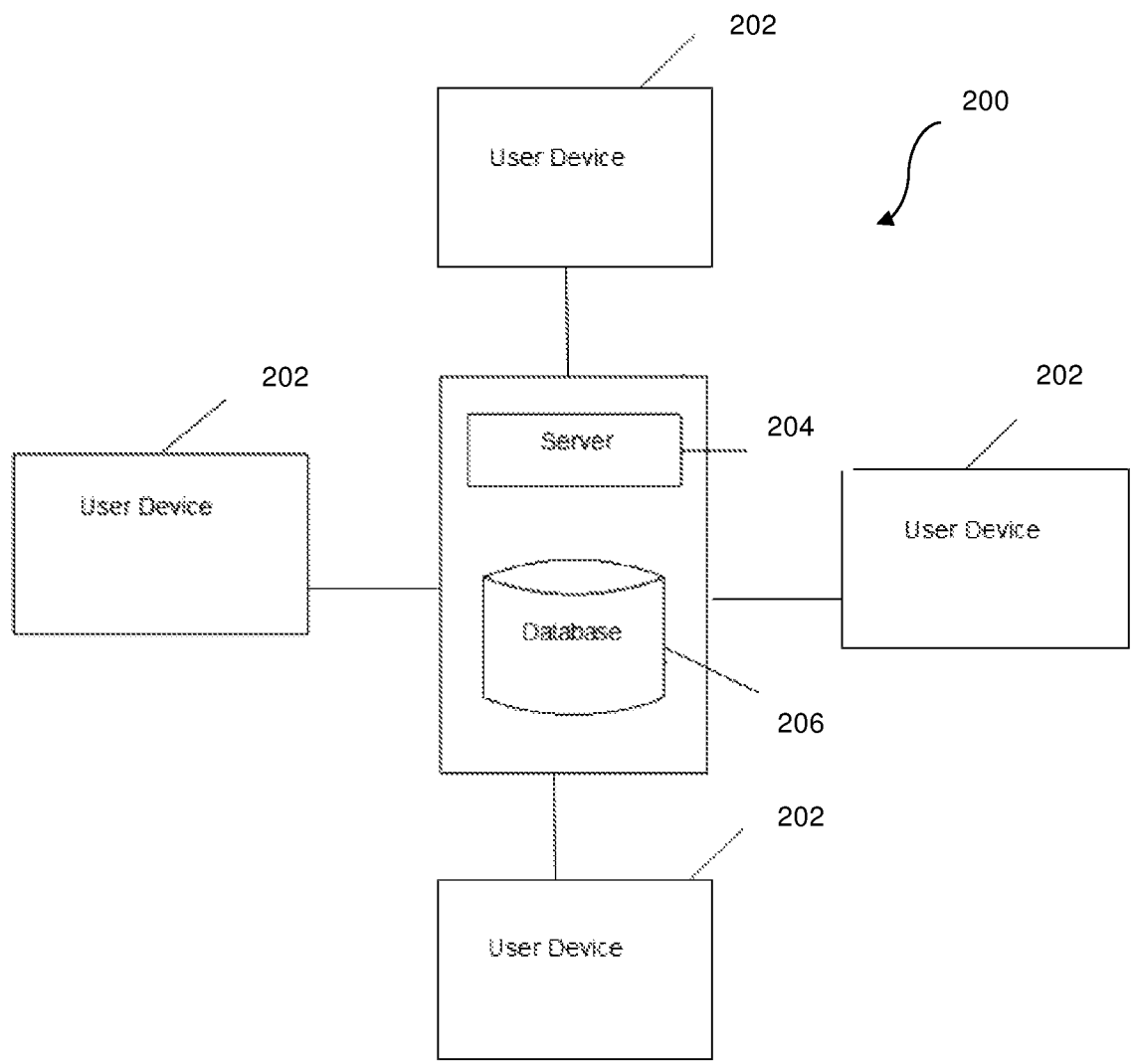
FIG. 15 is a functional block diagram of a system for implementing the method.

Referring to FIG. 15, the method 100 may be implemented in a system 200 as a web and/or mobile software application comprising one or more computer program modules executable by one or more computing devices 202 associated with individual users of the group of users that communicate via a network with one or more servers 204 and associated databases 206. The one or more computing devices 202 may comprise desktop computers, laptop computers, tablet computers, smartphones, and combinations thereof. The server 204 may provide an online collaborative portal for the group of users to efficiently exchange empty shipping containers among themselves.

Figure 16:
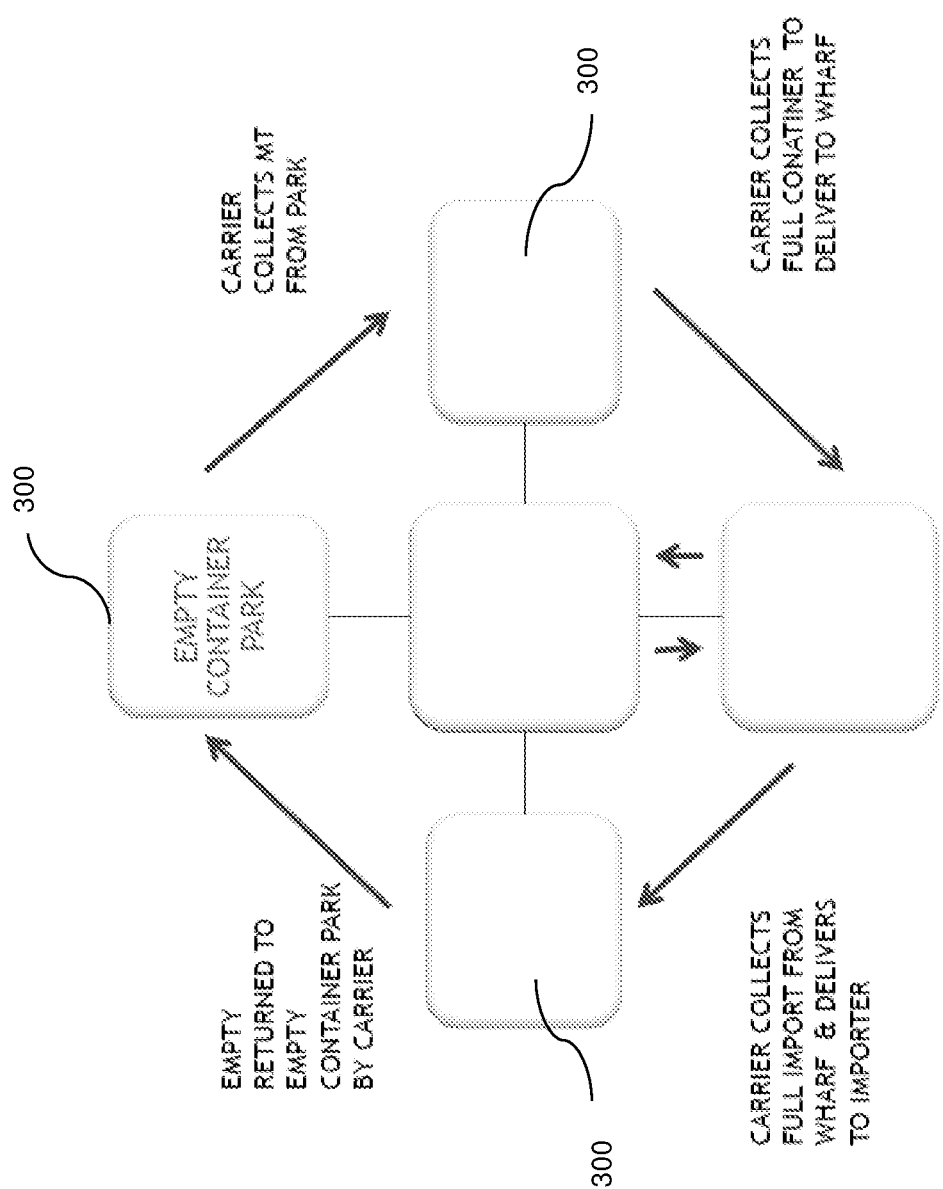
FIGS. 16 and 17 are schematic diagrams respectively illustrating conventional empty shipping container handling and alternative empty shipping container handling facilitated by the method and system.
Figure 17:
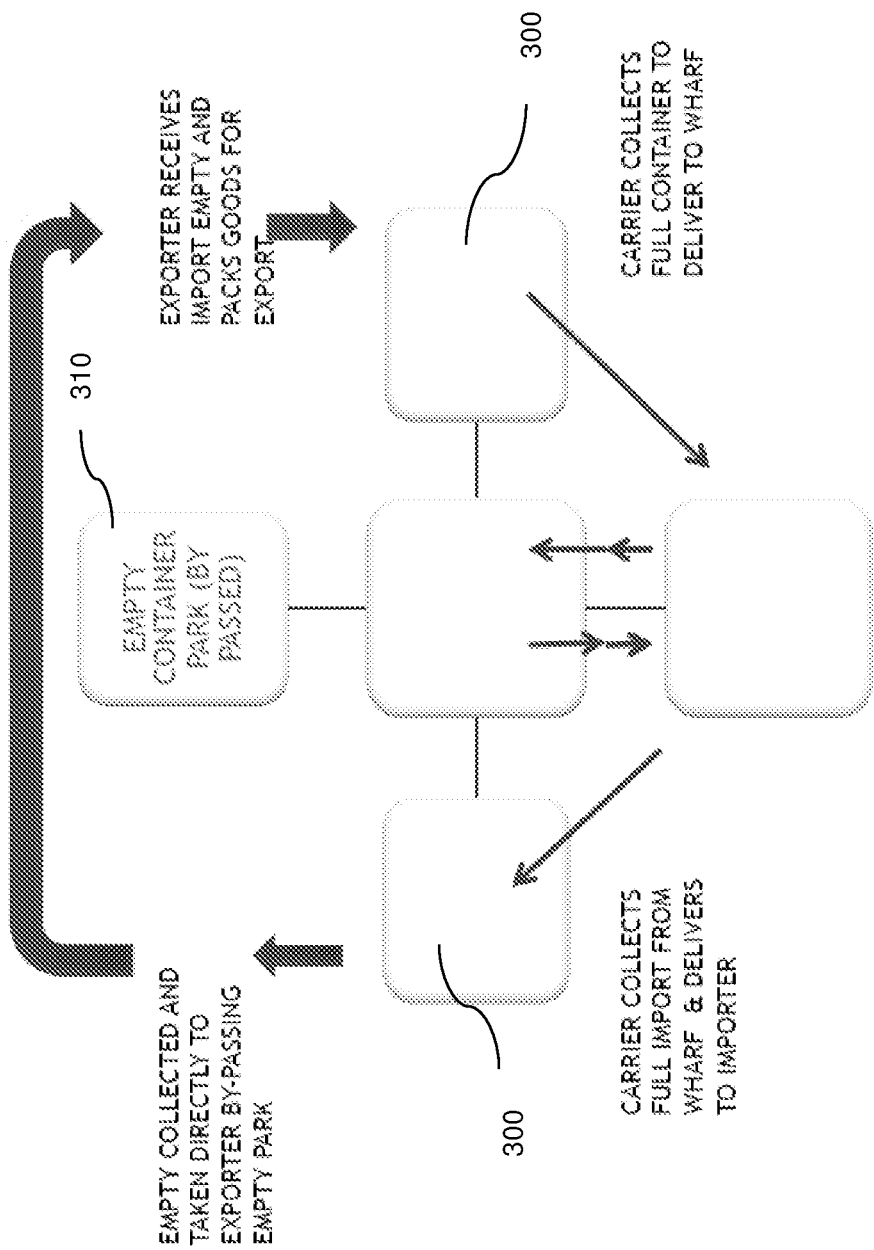

In use, the method 100 and system 200 may enable the plurality of transport companies to collaborate to implement more efficient empty shipping container logistics practices. FIG. 16 illustrates conventional handling of empty import and export shipping containers in which transport companies (or carriers) pick up and return empty shipping containers to and from a plurality of different importer and exporter locations 300 via an empty container park 310. FIG. 17 illustrates alternative handling of empty import and export shipping containers facilitated by the method 100 and system 200 in which transport companies bypass the container park 310 by exchanging empty shipping containers directly at the plurality of different importer and export locations 300.

Optionally, the method 100 and system 200 may be configured to provide conventional triangulation or reuse of empty shipping containers as an additional service to container exchange. The triangulation functionality optionally provided by the method 100 and system 200 may use the automated process described above to obtain approval from shipping lines for the empty import shipping containers to be reused for export.

The method 100 and system 200 may be further configured to recommend (or suggest) matches between empty import containers and empty export containers to be exchanged between individual users of the group of users. The recommended matches (or exchange suggestions) may, for example, be based at least in part on:
 type of container;
 location of container;
 required delivery date;
 distance between exchange locations;
 access time at location of container;
 type of transport vehicle; and
 estimated time of arrival of transport vehicle at location of container.

Figure 18:
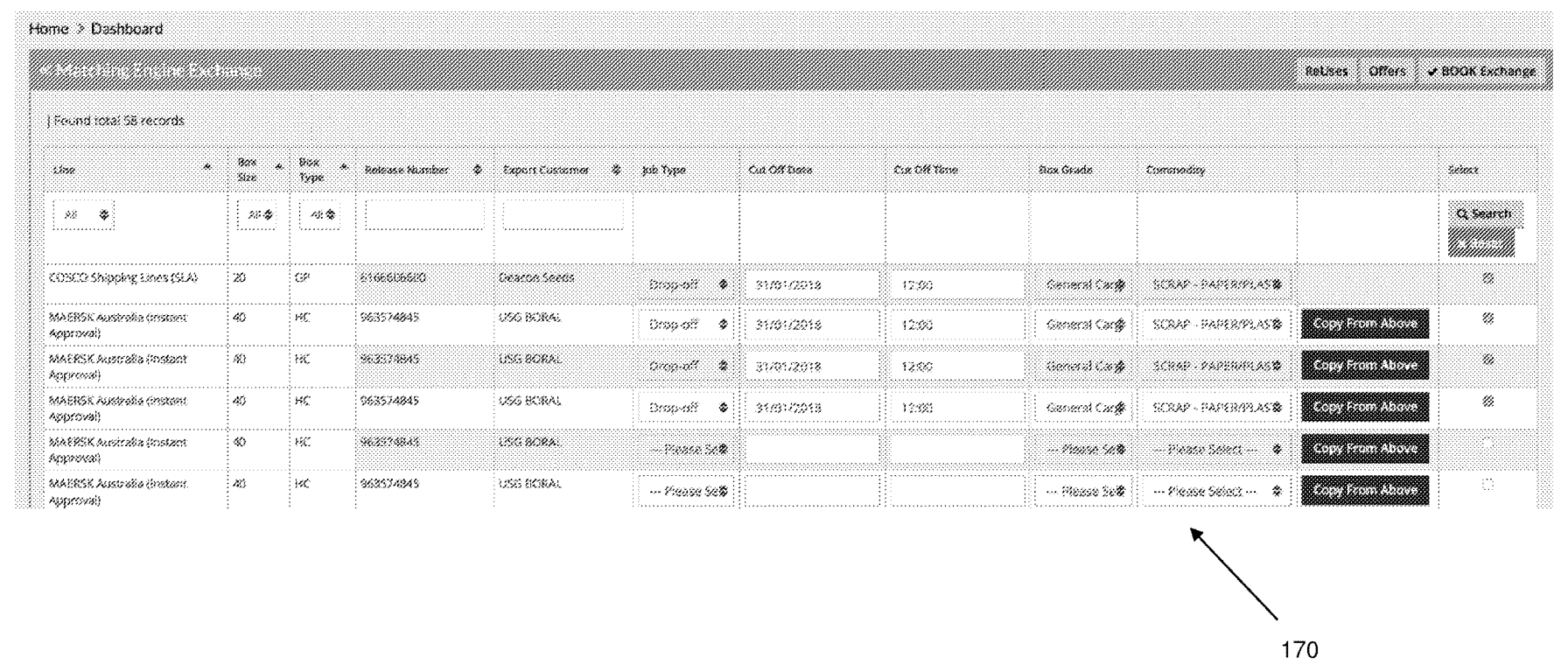
Figure 20:
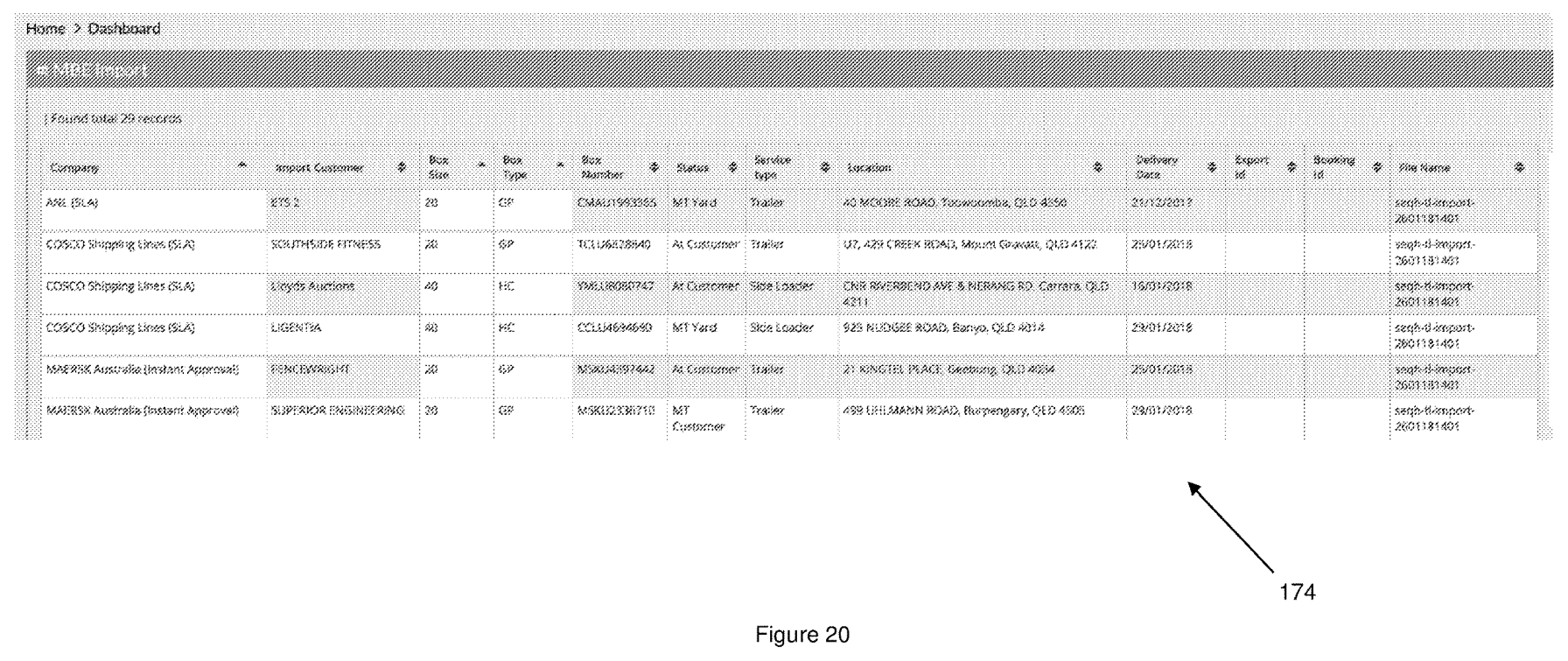
Figure 21:
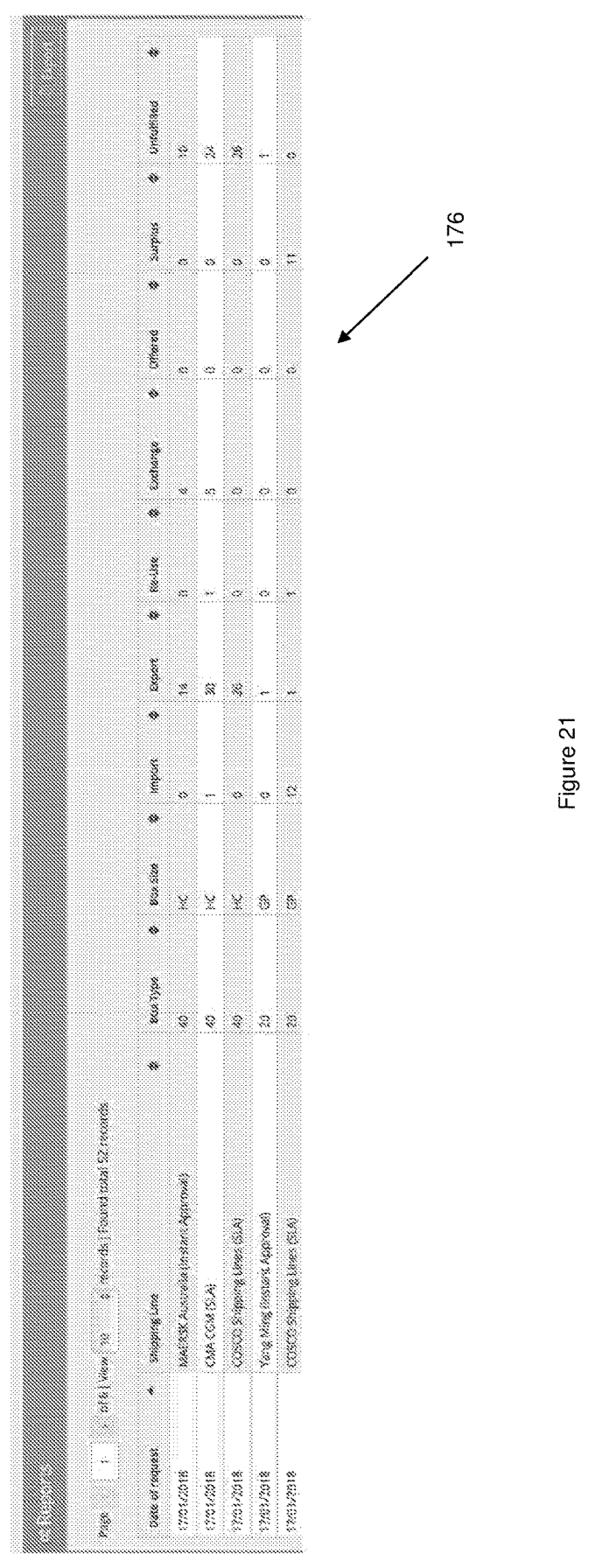

The method 100 may further comprise notifying individual users of the group of users of the recommended container matches. For example, the recommended container matches may be displayed on the dashboard 170 illustrated in FIG. 18 and/or sent as push notifications or alerts to mobile devices associated with the individual users. A plurality of recommended container matches, for example the best five recommended matches of containers for exchange, may be generated and notified to the individual users. Data relating to the recommended matching export and import containers may be displayed to individual users by dashboards 172, 174 illustrated in FIGS. 19 and 20, respectively. The individual users may then accept or reject offers to exchange the recommended matching containers as described above. Individual users may also be able to generate reports and analyse data relating to recommended matching containers via a reports dashboard 176 illustrated in FIG. 21. The reports may comprise analysis or summaries of data that, for example, includes:
 import and export exchange bookings by shipping line, size and type;
 number of exchange recommendations;
 number of containers offered for exchange;
 surpluses of empty containers; and
 unfulfilled exchange booking (eg, missed exchange opportunities).

The method 100 and system 200 may be further configured to predict matches between empty import containers and empty export containers to be exchanged between individual users of the group of users. The predicted matches may be based at least in part on historical data relating to surpluses and shortfalls of empty import containers and empty export containers by the individual users of the group of users. The historical data relating to container surpluses and shortfalls may be analysed to identify patterns or trends for each transport company's import and export bookings. These patterns or trends in container surpluses and shortfalls may be used to generate a container profile for each transport company. For example, if a transport company frequently receives between 10 to 20 containers for a specific shipping line as import bookings, and frequently requires about 5 to 10 of the same containers for export bookings, then the transport company may be able offer their surplus import containers for exchange. Conversely, if another transport company frequently receives around 5 to 10 containers for the same shipping line as import bookings, and frequently requires about 10 to 20 containers for export bookings, then it may be predicted that they frequently need to source their shortfall in export containers by exchange.

Embodiments of the present invention provide a collaborative online portal that is useful to enable different transport companies to efficiently exchange empty shipping containers among themselves.

For the purpose of this specification, the word "comprising" means "including but not limited to," and the word "comprises" has a corresponding meaning.

The above embodiments have been described by way of example only and modifications are possible within the scope of the claims that follow.

The invention claimed is:

1. A computer-implemented method under control of one or more computing devices configured with specific computer-executable instructions, the method comprising:
   receiving a request from a first user of a group of users for an empty export container;
   notifying the group of users of the request;
   receiving an offer from a second user of the group of users to match the request by exchanging an empty import container owned or leased by a shipping line;
   notifying the first user of the offer;
   if the offer is accepted by the first user, determining if the empty import container is approved by the shipping line to be exchanged as the empty export container; and
   if the empty import container is approved, notifying the first and second users to exchange the empty import container as the empty export container.

2. The method of claim 1, wherein the group of users comprises a plurality of different transport companies.

3. The method of claim 1, wherein the request comprises information relating to requestor, shipping line, container size, container type, container grade, commodity, export release number, pick-up/drop-off location, cut-off date/time, and combinations thereof.

4. The method of claim 1, wherein the offer comprises information relating to exchange type (drop-off or pick-up), drop-off or pick-up location, cut-off date/time, container number, offeror, container size, container type, container grade, commodity, export release number, and combinations thereof.

5. The method of claim 1, further comprising receiving confirmation from the first and second users that exchange of the empty import container as the empty export container has been completed.

6. The method of claim 1, wherein the step of determining if the empty import container is approved to be exchanged as the empty export container comprises comparing the empty import container with a database of containers pre-approved for exchange by the shipping line.

7. The method of claim 6, wherein the database of containers pre-approved for exchange by the shipping line is generated by electronic data interchange (EDI) with the shipping line.

8. The method of claim 1, wherein the step of determining if the empty import container is approved to be exchanged as the empty export container comprises requesting and receiving approval from the shipping line for the empty import container to be exchanged as the empty export container.

9. The method of claim 1, further comprising generating a dashboard user interface that enables an individual user of the group of users to view, filter and manage a plurality of information relating to a plurality of empty import containers available for exchange as empty export containers among the group of users.

10. The method of claim 1, further comprising recommending matches between empty import containers and empty export containers available to be exchanged between individual users of the group of users, wherein the recommended matches are based at least in part on:
    type of container;
    location of container;
    required delivery date;
    distance between exchange locations;
    access time at location of container;
    type of transport vehicle; and
    estimated time of arrival of transport vehicle at location of container.

11. The method of claim 10, further comprising notifying individual users of the group of users of the recommended matches.

12. The method of claim 1, further comprising predicting matches between empty import containers and empty export containers to be exchanged between individual users of the group of users, wherein the predicted matches are based at least in part on historical data relating to surpluses and shortfalls of empty import containers and empty export containers by the individual users of the group of users.

13. A system, comprising:
    one or more non-transitory computer readable storage media;
    one or more processors; and
    one or more program modules stored in the one or more non-transitory computer readable storage media and executed by the one or more processors to:
       receive a request from a first user of a group of users for an empty export container;
       notify the group of users of the request;
       receive an offer from a second user of the group of users to match the request by exchanging an empty import container owned or leased by a shipping line;
       notify the first user of the offer;
       if the offer is accepted by the first user, determine if the empty import container is approved by the shipping line to be exchanged as the empty export container; and
       if the empty import container is approved, notify the first and second users to exchange the empty import container as the empty export container.

14. A non-transitory computer-readable medium storing specific computer-executable instructions that, when operated by a processor, perform operations comprising:
    receiving a request from a first user of a group of users for an empty export container;
    notifying the group of users of the request;
    receiving an offer from a second user of the group of users to match the request by exchanging an empty import container owned or leased by a shipping line;
    notifying the first user of the offer;
    if the offer is accepted by the first user, determining if the empty import container is approved by the shipping line to be exchanged as the empty export container; and
    if the empty import container is approved, notifying the first and second users to exchange the empty import container as the empty export container.

* * * * *